United States Patent
Iwasaki

(10) Patent No.: US 7,660,520 B2
(45) Date of Patent: Feb. 9, 2010

(54) CAMERA SYSTEM WITH CURRENT AND DISCHARGE CONTROLLED ILLUMINATION

(75) Inventor: Hiroyuki Iwasaki, Yokohama (JP)

(73) Assignee: Nikon Corporation, Tokyo (JP)

( * ) Notice: Subject to any disclaimer, the term of this patent is extended or adjusted under 35 U.S.C. 154(b) by 370 days.

(21) Appl. No.: 10/589,354

(22) PCT Filed: Feb. 9, 2005

(86) PCT No.: PCT/JP2005/001955

§ 371 (c)(1),
(2), (4) Date: Aug. 11, 2006

(87) PCT Pub. No.: WO2005/078529

PCT Pub. Date: Aug. 25, 2005

(65) Prior Publication Data

US 2007/0189754 A1  Aug. 16, 2007

(30) Foreign Application Priority Data

Feb. 12, 2004  (JP) .............................. 2004-034733

(51) Int. Cl.
*G03B 9/70* (2006.01)
*G03B 15/02* (2006.01)
*G03B 15/03* (2006.01)

(52) U.S. Cl. .................... 396/166; 396/182; 362/12

(58) Field of Classification Search ................ 396/157, 396/166, 167, 182; 362/11, 12; 348/370, 348/371

See application file for complete search history.

(56) References Cited

U.S. PATENT DOCUMENTS 5,895,128 A * 4/1999 Kishimoto et al. ............ 396/61

(Continued)

FOREIGN PATENT DOCUMENTS

JP        A 9-68742        3/1997

(Continued)

OTHER PUBLICATIONS

HP Photosmart 945 User's Manual, (c) 2003 Hewlett-Packard Development Company.*

(Continued)

*Primary Examiner*—W. B. Perkey
*Assistant Examiner*—Leon W Rhodes
(74) *Attorney, Agent, or Firm*—Oliff & Berridge, PLC

(57) ABSTRACT

The present invention relates to a camera system that illuminates a subject being photographed and its object is to provide the camera system capable of photographing at a shutter speed exceeding a synchronous speed or continuous shooting. An electronic camera according to the present invention controls a xenon tube (81) to emit flash light at a shutter speed lower than the synchronous speed in a single-shot photographing mode, and controls a LED (83*a*) to emit light at a shutter speed exceeding the synchronous speed so as to continuously emit light while a slit defined by a shutter front curtain and a rear curtain is moving over an effective imaging area of an imaging element. When performing a rear curtain sync photographing or front curtain photographing in a single-shot photographing mode, the xenon tube (81) emits flash light. When a low-speed photographing operation is executed in a single-shot photographing mode, the LED (83*a*) emits light so that light emission continues while electrical charges are stored at the imaging element. In a continuous shooting mode, the LED (83*a*) emits light so as to continue light emission while the electrical charges are stored at the imaging element and to stop the light emission when the stored charges are being transferred.

11 Claims, 7 Drawing Sheets

U.S. PATENT DOCUMENTS

| | | | |
|---|---|---|---|
| 6,456,797 B1* | 9/2002 | Boyd et al. | 396/155 |
| 2004/0008274 A1* | 1/2004 | Ikari et al. | 348/370 |
| 2005/0089322 A1* | 4/2005 | Uenaka | 396/157 |
| 2005/0157205 A1* | 7/2005 | Voss et al. | 348/370 |
| 2005/0157207 A1* | 7/2005 | Voss et al. | 348/371 |
| 2005/0265014 A1* | 12/2005 | Matsui et al. | 362/5 |

FOREIGN PATENT DOCUMENTS

| | | |
|---|---|---|
| JP | A 10-206942 | 8/1998 |
| JP | A 2001-209093 | 8/2001 |
| JP | A 2003-295271 | 10/2003 |
| JP | A 2005-107240 | 4/2005 |

OTHER PUBLICATIONS

PC Magazine review of HP Photosmart 945 camera, PC Magzine: Dec. 30, 2003 issue.*

* cited by examiner

CAMERA SYSTEM WITH CURRENT AND DISCHARGE CONTROLLED ILLUMINATION

TECHNICAL FIELD

The present invention relates to a camera system that illuminates a subject being photographed.

BACKGROUND ART

Japanese Laid Open Patent Publication No. H10-206942 discloses an illuminating device for illuminating a subject being photographed, which includes a discharge light source constituted with a xenon lamp or the like and a current-controlled light source constituted with light emitting diodes (LEDs) or the like. The illuminating device includes an LED which emits red color light and an LED that emits blue color light so as to correct the color temperature of flash light emitted from the discharge light source. When the flash light is emitted, either or both of the red color LED and the blue color LED are controlled to enter an ON state in correspondence to the extent to which the color temperature needs to be corrected. The ON timing with which the individual light sources are turned on is set so that the LEDs sustain an ON state while the shutter in the camera is open and that the discharge light source emits flash light with predetermined timing while the shutter is open.

DISCLOSURE OF THE INVENTION

In the illuminating device described above, the LEDs are turned on when flash light is emitted by assuming that the camera is used in a single-shot photographing operation with the shutter speed at the camera set equal to or lower than the synchronous speed of the discharge light source. In other words, the illuminating device does not support a photographing operation executed at a shutter speed exceeding the synchronous speed or a continuous shooting operation.

A camera system according to a first aspect of the present invention includes a photographing mode selection device that selects one of a single-shot photographing mode for photographing an image for a single frame in response to a photographing instruction and a continuous shooting mode for photographing images for a plurality of frames in response to a photographing instruction; a discharge control-type first illuminating device that emits illuminating light toward a subject in response to a light emission instruction issued after light emission is enabled; a current-controlled second illuminating device that emits illuminating light toward the subject in response to the light emission instruction; and an illumination control device that issues a light emission instruction to the first illuminating device if the single-shot photographing mode has been selected by the photographing mode selection device and issues the light emission instruction to the second illuminating device if the continuous shooting mode has been selected by the photographing mode selection device.

In the camera system according to the first aspect, the first illuminating device may include a charge circuit; and if an extent of electrical charge achieved in the charge circuit is still under a predetermined level when a light emission instruction is to be issued to the first illuminating device, the illumination control device may issue the light emission instruction to the second illuminating device instead of the first illuminating device. The camera system according to the first aspect may further include an imaging device that captures a subject image and outputs an imaging signal, and the second illuminating device may repeatedly emit light and turn off light in synchronization with timing with which the imaging device captures an image for each frame.

A camera system according to a second aspect of the present invention includes a discharge control-type first illuminating device that emits illuminating light toward a subject in response to a light emission instruction issued after light emission is enabled; a current-controlled second illuminating device that emits illuminating light toward the subject in response to the light emission instruction; and an illumination control device that (1) issues the light emission instruction to one of the first illuminating device and the second illuminating device if a shutter speed for a photographing operation is set equal to or lower than a synchronous speed for the first illuminating device and (2) issues the light emission instruction to the second illuminating device if the shutter speed for the photographing operation is set higher than the synchronous speed.

In the camera system according to the second aspect, the illumination control device may (3) issue the light emission instruction to the second illuminating device if the shutter speed for the photographing operation is set equal to or lower than a predetermined speed that is lower than the synchronous speed for the first illuminating device and (4) issue the light emission instruction to the first illuminating device if the shutter speed for the photographing operation is set higher than the predetermined speed and also equal to or lower than the synchronous speed. The camera system according to the second aspect may further include a photographing control device that issues an instruction for the second illuminating device to start light emission and an exposure start instruction in response to a photographing instruction when the shutter speed for the photographing operation is set equal to or less than the predetermined speed, and issues an exposure end instruction and a light emission stop instruction for the second illuminating device when a predetermined length of time elapses following the exposure start.

In the camera system according to the second aspect, the illumination control device may (3) issue the light emission instruction to one of the first illuminating device and the second illuminating device if the shutter speed for the photographing operation is set equal to or lower than a predetermined speed that is lower than the synchronous speed for the first illuminating device and (4) issue the light emission instruction to the first illuminating device if the shutter speed for the photographing operation is set higher than the predetermined speed and also equal to or lower than the synchronous speed. In the camera system according to the second aspect, it is preferable that the illumination control device issues the light emission instruction to the first illuminating device when a front curtain sync photography or a rear curtain sync photography is to be executed.

A camera system according to a third aspect of the present invention includes a photographing mode selection device that selects one of a still image photographing mode for photographing a still image in response to a photographing instruction and a dynamic image photographing mode for photographing a dynamic image in response to a photographing instruction; a discharge control-type first illuminating device that emits illuminating light toward a subject in response to a light emission instruction issued after light emission is enabled; a current-controlled second illuminating device that emits illuminating light toward the subject in response to the light emission instruction; and an illumination control device that issues the light emission instruction to the first illuminating device if the still image photographing mode has been selected by the photographing mode selection device and issues the light emission instruction to the second illuminating device if the dynamic image photographing mode has been selected by the photographing mode selection device.

A camera system according to a fourth aspect of the present invention includes an imaging device that captures a subject image and outputs an imaging signal; a current-controlled illuminating device that emits illuminating device toward a subject in response to a light emission instruction issued after light emission is enabled; and an illumination control device that controls the illuminating device so as to repeatedly emit light and turn off light synchronously with the timing with which an image is captured for each frame by the imaging device while images for a plurality of frames are continuously captured in response to a photographing instruction.

BEST MODE FOR CARRYING OUT THE INVENTION

Figure 1:
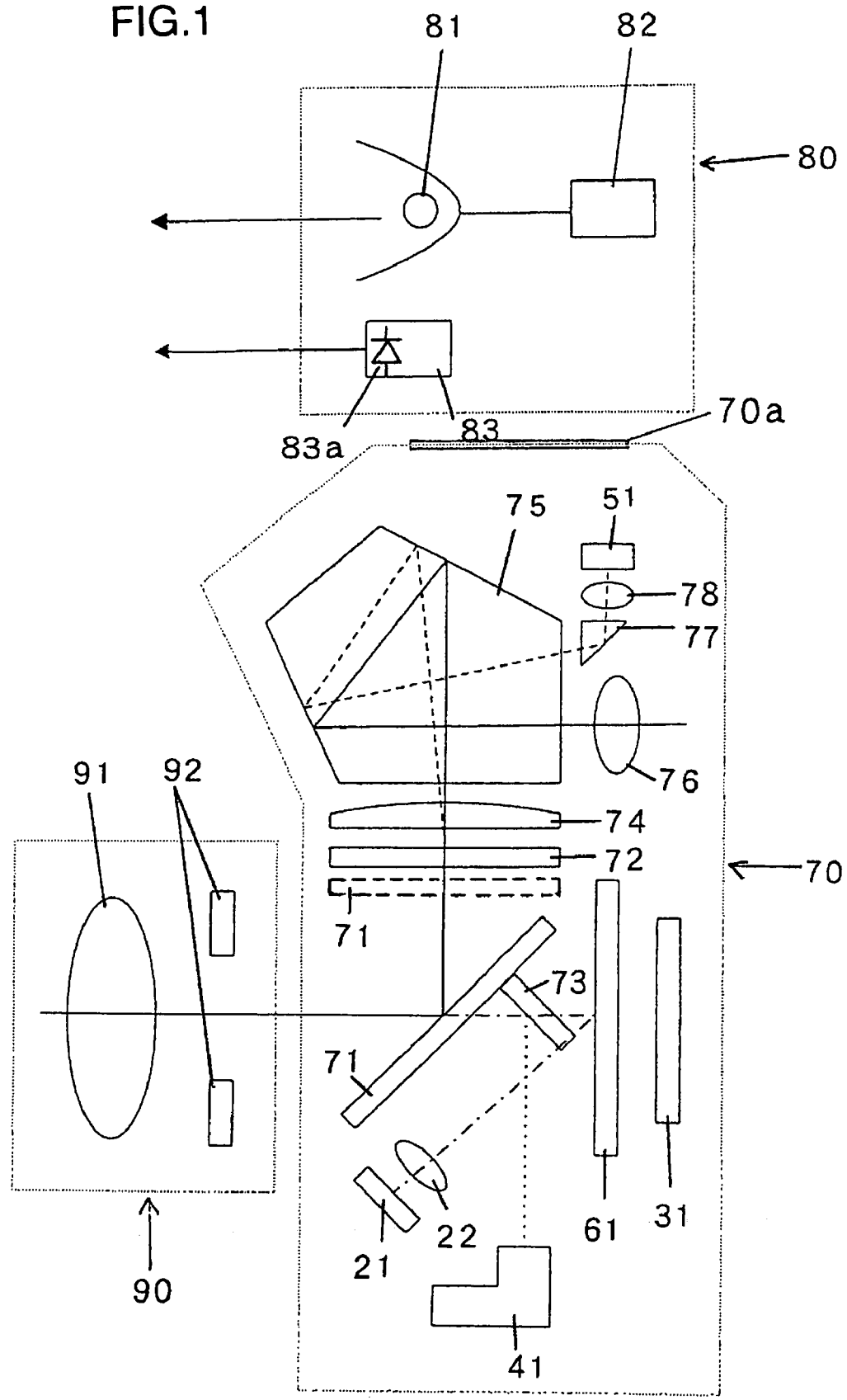
FIG. 1 illustrates an electronic camera system achieved in an embodiment of the present invention.

The following is an explanation of the best mode for carrying out the present invention, given in reference to the drawings. FIG. 1 shows an electronic camera system achieved in an embodiment of the present invention. The electronic camera system in FIG. 1 includes a single-lens reflex electronic camera body 70 and an illuminating device 80 detachably mounted at the camera body 70. An interchangeable lens 90 that houses a lens 91 and an aperture 92 is mounted at the camera body 70.

The illuminating device 80, which includes a xenon (Xe) discharge tube 81, a light emission circuit 82 for the xenon discharge tube 81, an LED 83a and a light emission circuit 83 for the LED 83a, is mounted at an accessory shoe 70a located at the camera body 70. The illuminating device 80 communicates with a CPU 101 (see FIG. 2) at the camera body 70 via a communication contact point (not shown) at the accessory shoe 70a to exchange light emission switch signals for the xenon tube 81 and the LED 83a, timing signals constituting instructions for light emission start and light emission end, a light output quantity instruction signal, signals indicating "pre-light emission state (charge in progress)" and "light emission preparation completion" at the light emission circuit 82 and the like.

A subject light flux having passed through the interchangeable lens 90 and having entered the camera body 70 is guided upward via a quick return mirror 71, which is set at the position indicated by the solid line prior to a shutter release and thus forms an image at a focusing screen 72. Part of the subject light flux is reflected downward at a sub mirror 73 and, as a result, an image is also formed at a focus detection device 41. The subject light flux having formed an image at the focusing screen 72 further advances into a pentaprism 75 via a lens 74. At the pentaprism 75, the subject light flux having entered therein is guided to an eyepiece lens 76 and part of the subject light flux having entered therein is guided toward a prism 77. The light flux having entered the prism 77 then enters a photometering device 51 via a lens 78.

Following a shutter release, the quick return mirror 71 swings to the position indicated by the dotted line, and thus, the subject light flux is guided toward a photographic imaging device 31 via a shutter 61. It is to be noted that after the quick return mirror 71 swings to the position indicated by the dotted line, the subject light flux is reflected at the shutter curtain surfaces and enters a flash control photometering device 21 via a lens 22 until a curtain (not shown) at the shutter 61 opens.

Figure 2:
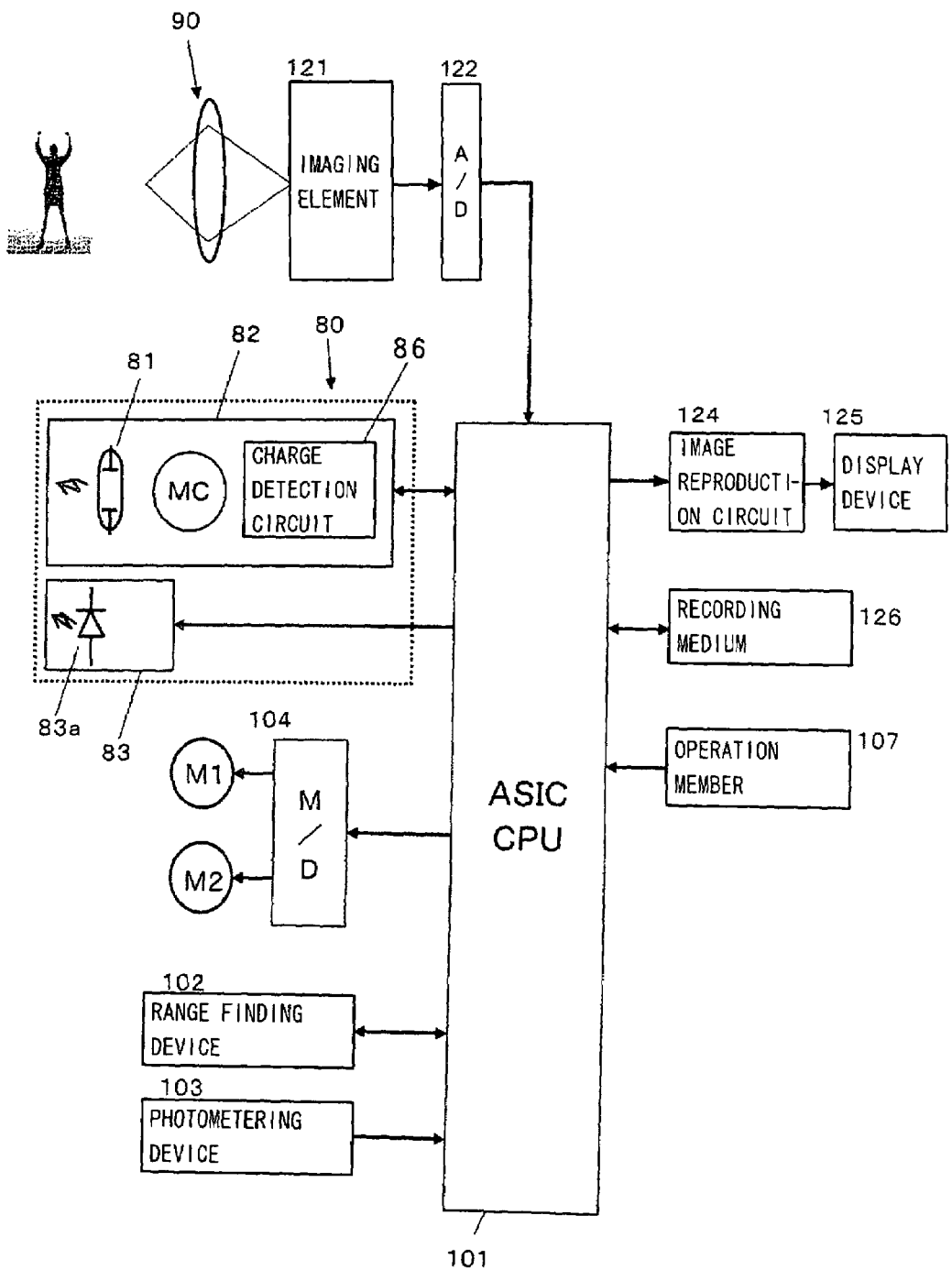
FIG. 2 is a block diagram showing the essential structure adopted in the electronic camera system.

FIG. 2 is a block diagram showing the essential structure of the electronic camera system described above. The CPU 101 may be constituted with, for instance, an ASIC (application specific integrated circuit). The CPU 101 executes specific arithmetic operations by using signals input thereto from various blocks to be detailed later and outputs control signals generated based upon the arithmetic operation results to the individual blocks.

An imaging element 121 is constituted with a CCD image sensor or the like in correspondence to the imaging device 31 in FIG. 1. The imaging element 121 captures an image formed with a subject light flux having passed through the interchangeable lens 90 and outputs an imaging signal to an A/D conversion circuit 122. The A/D conversion circuit 122 converts the analog imaging signal to a digital signal.

In addition to image processing such as white balance processing executed on image data resulting from the digitization at the A/D conversion circuit 122, the CPU 101 executes compression processing for compressing the image data resulting from the image processing in a predetermined format, decompression processing for decompressing compressed image data and the like. A recording medium 126 is constituted with a memory card or the like that can be detachably loaded into the electronic camera body 70. Image data resulting from the image processing are recorded into the recording medium 126.

An image reproduction circuit 124 generates data to be used to display a reproduced image by using uncompressed image data (image data yet to be compressed or decompressed image data). At a display device 125, constituted with, for instance, a liquid crystal display monitor, an image expressed via the reproduction display data is brought up on display.

Figure 3:
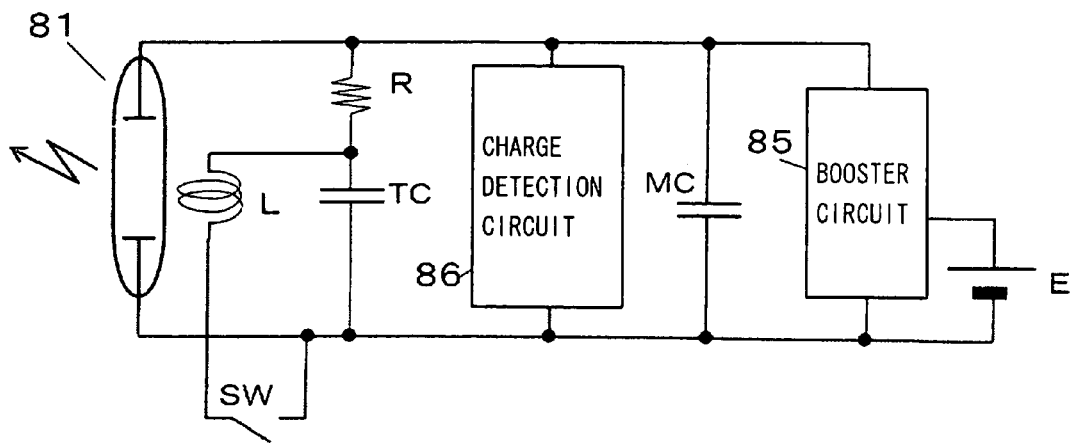
FIG. 3 presents a structural example that may be adopted in conjunction with a xenon tube and a light emission circuit.

The light emission circuit 82 in the illuminating device 80 releases the electrical charges stored at a main capacitor MC into the xenon tube 81 in response to an instruction issued by the CPU 101 so as to emit flash light from the xenon tube 81. FIG. 3 presents a structural example that may be adopted in conjunction with the xenon tube 81 and the light emission circuit 82.

As a main switch (not shown) at the illuminating device 80 is turned on, a booster circuit 85 in FIG. 3 boosts the voltage from a battery E up to, for instance, 330 V, and the main capacitor MC becomes charged. A charge detection circuit 86 turns on a pilot lamp (not shown) and transmits a signal indicating the completion of light emission preparation to the CPU 101 (see FIG. 2) at the camera body 70 as the charge voltage at the main capacitor MC reaches a predetermined level (e.g., 270V).

A resistor R, a trigger capacitor TC and a trigger coil L together constitute a trigger circuit. The trigger circuit charges the trigger capacitor TC via the resistor R as the main capacitor MC becomes charged. As a signal constituting a light emission start instruction (a so-called X contact point signal) is transmitted from the CPU 101 at the camera body 70 in this state, a synchro switch SW enters an ON state, thereby further boosting the charge voltage at the trigger capacitor TC via the trigger coil L, and the boosted voltage is applied to a trigger electrode (not shown) at the xenon tube 81. In response, light emission starts within the xenon tube 81, and the xenon tube 81 emits flash light by using this light emission as a trigger. In other words, the electrical energy having accumulated at the main capacitor MC is released or discharged inside the xenon tube 81.

Figure 4:
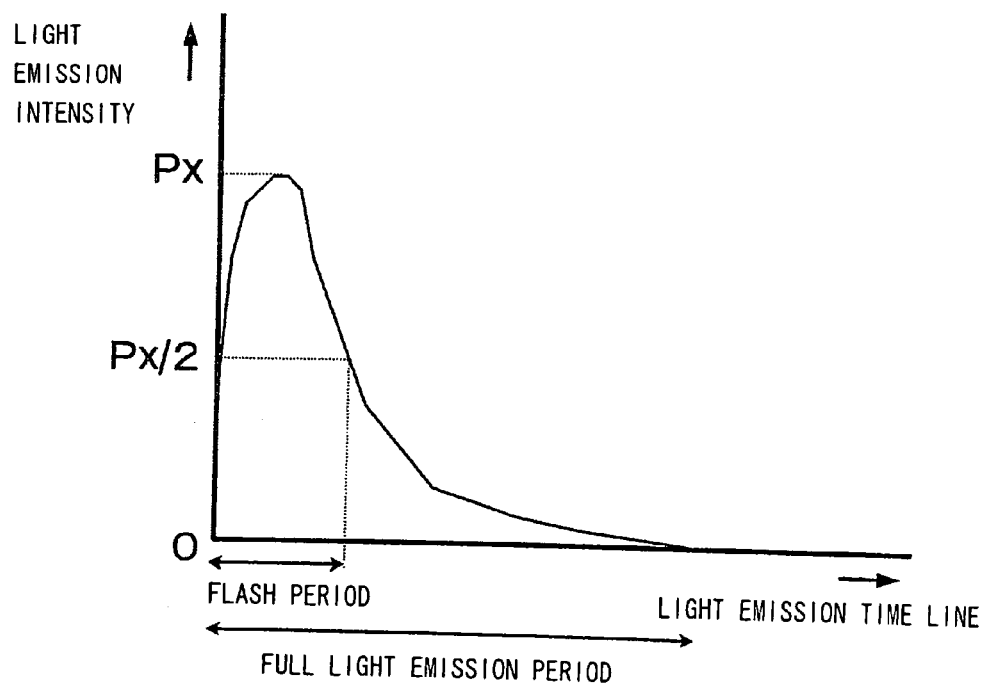
FIG. 4 shows a waveform of light emitted via the xenon tube.

FIG. 4 shows the waveform of the light emitted by the xenon tube 81. In FIG. 4, the light emission timeline extends along the horizontal axis and the light emission intensity is indicated along the vertical axis. As the synchro switch SW enters an ON state, the xenon tube 81 immediately starts to emit light until the light emission intensity thereof reaches a maximum value Px. The discharge light emission ends once the energy stored in the main capacitor MC becomes depleted. Normally, the length of time to elapse before the light emission intensity decreases to ½ of the maximum value Px is referred to as a "flash period" and the length of time to elapse before the discharge light emission ends is referred to as a "total light emission period". It is to be noted that flash control light emission is executed during the actual photographing operation so as to control the quantity of emitted light based upon the cumulative value representing the sum of the values indicated in detection signals provided by the flash control photometering device 21 (see FIG. 1). Accordingly, the discharge light emission inside the xenon tube 81 is stopped by stopping the power supply to the xenon tube 81 before the total light emission period in FIG. 4 elapses. As a result, the quantity of light emitted through the xenon tube 81 is adjusted to a predetermined value. It is to be noted that FIG. 3 does not include the circuit engaged in operation to stop the light emission at the xenon tube 81.

As the waveform of the emitted light in FIG. 4 indicates, the xenon tube 81 is not suited to applications in which the main subject needs to be illuminated continuously at a constant intensity level. In addition, following a light emission, the main capacitor MC needs to be charged in preparation for the next light emission, and thus, it is difficult to repeatedly emit light and charge the main capacitor 10 times or more per second. Furthermore, the flash period over which flash light is emitted via the xenon tube 81 is in a 1/1000 sec order and thus, the shutter speed needs to be set lower than the synchronous speed, e.g., 1/250 sec, when the xenon tube is used in conjunction with a standard focal plane shutter, since the optimal exposure is not achieved at the imaging element 121 and only the area of the photographic image plane, which corresponds to the position of the slit defined by the shutter front curtain and the shutter rear curtain when flash light is emitted through the xenon tube 81, is exposed at a higher shutter speed for slit exposure over the slit area defined by the shutter front curtain and the shutter rear curtain. Namely, the shutter speed needs to be set lower than the synchronous speed since the length of time required for the slit to move across the effective imaging area on the imaging element 121 is greater than the flash period of the xenon tube 81. The synchronous speed is represented by the value indicated by the maximum shutter speed setting at which a photographing operation can be executed by using flash light emitted from the xenon tube 81.

Figure 5:
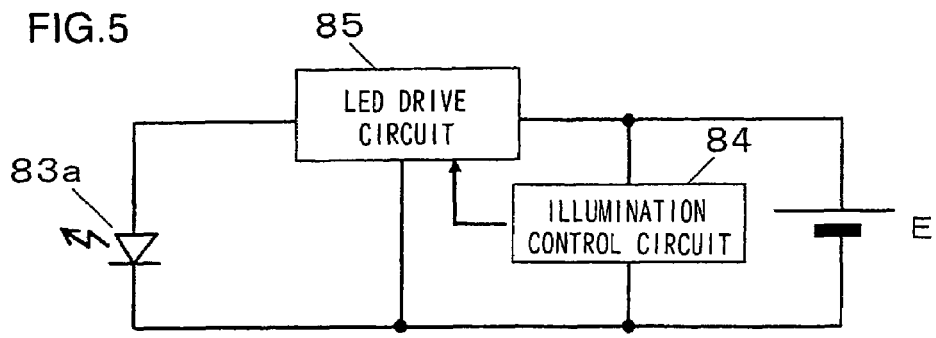
FIG. 5 presents a structural example that may be adopted in conjunction with the LED and the light emission circuit.

The LED 83a in the illuminating device 80 is constituted with a white LED. FIG. 5 presents a structural example that may be adopted in conjunction with the LED 83a and the light emission circuit 83. Signals indicating the timing with which light emission is to start at the LED 83a the timing with which light emission is to stop and the quantity of light to be emitted from the LED 83a are input from the CPU 101 at the camera body 70 to an illumination control circuit 84. As is known in the related art, an LED is a current-controlled device manifesting a proportional relationship between the drive current and the light emission intensity (light power) within its rated range. Based upon the contents of the instructions provided by the CPU 101, the illumination control circuit 84 determines the value representing the level of electrical current to be supplied to the LED 83a and outputs a command for an LED drive circuit 85 to supply an electrical current with the determined current value to the LED 83a. The quantity of light to be emitted from the LED 83a is thus controlled.

Data indicating the relationship between the light emission intensity at the LED 83a and the level of electrical current supplied thereto are provided in a table generated based upon the results of actual measurement and the table is stored in a nonvolatile memory inside the illumination control circuit 84. The illumination control circuit 84 references the table by using the light emission intensity as an argument and thus determines the required electrical current to be supplied to the LED. It then issues an instruction for the LED drive circuit 85 indicating the required current value. In response to the command output from the illumination control circuit 84, the LED drive circuit 85 supplies the required electrical current to the LED 83a. It is to be noted that the battery E is used as a power source for the illumination control circuit 84 and the LED drive circuit 85.

Figure 6:
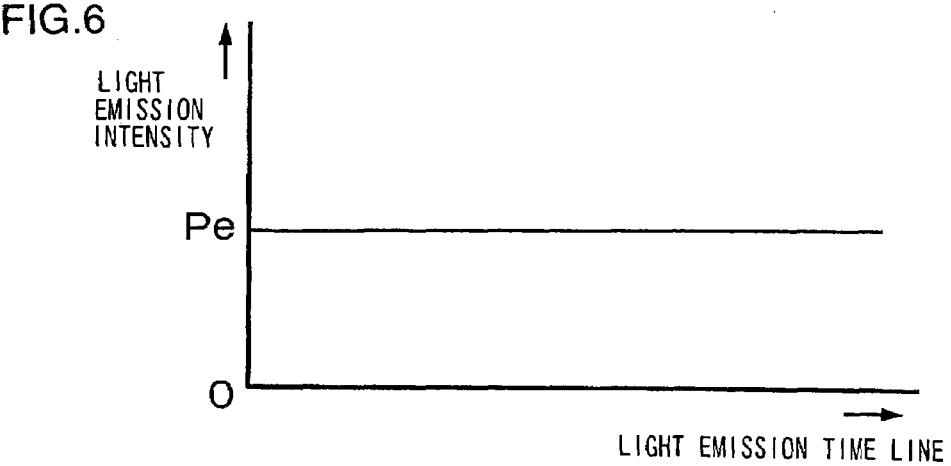
FIG. 6 shows the waveform of the light emitted from the LED.

FIG. 6 shows the waveform of the light emitted from the LED 83a. The light emission timeline is indicated along the horizontal axis and the light emission intensity is indicated along the vertical axis in FIG. 6. As a constant drive current is supplied thereto, the LED 83a continuously emits light at a constant intensity level Pe. As the waveform of the emitted light in FIG. 6 indicates, the LED 83a is capable of continuously emitting light over a length of time greater than the total light emission period at the xenon tube 81. Accordingly, the LED 83a can be used at a shutter speed set lower than the synchronous speed, e.g., 1/250 sec, as well as at a shutter speed higher than 1/250 sec, at which slit exposure is executed, since the LED 83a can remain in an ON state longer than the length of time required for the slit to move across the effective imaging area on the imaging element 121.

A distance measurement (range finding) device 102 in FIG. 2 corresponds to the focus detection device 41 in FIG. 1. The distance measurement device 102 detects the state of the focal point position adjustment achieved via the interchangeable lens 90 (see FIG. 1) and outputs a detection signal to the CPU 101. Based upon the focus detection signal, the CPU 101 outputs a command for a focus lens drive mechanism (not shown) to drive forward/backward a focus lens (not shown) within the interchangeable lens 90 along the optical axis, thereby adjusting the focal point position of the exchangeable lens 90. It is to be noted that the detection signal provided by the distance measurement device 102 can be used as distance information indicating the distance to the main subject.

A photometering device 103 corresponds to the photometering device 51 in FIG. 1. The photometering device 103 detects the quantity of subject light and outputs a detection signal to the CPU 101. The CPU 101 calculates the subject brightness (luminance) BV based upon the detection signal thus provided.

When the illuminating device 80 is set in a light emission enabled state, the CPU 101 executes exposure calculation as expressed in (1) below based upon a current aperture value setting AV, a current shutter speed setting TV, the subject brightness BV calculated as described above and a current imaging sensitivity setting SV.

$$EV = AV + TV = BV + SV \quad (1)$$

EV in expression (1) represents the exposure. The CPU 101 calculates control exposure indicating the quantity of light to be emitted from the illuminating device 80 in correspondence to an exposure deviation ΔEV so as to achieve optimal exposure. The exposure deviation ΔEV indicates the difference between the control exposure and the optimal exposure. The quantity of light to be emitted is adjusted based upon the distance information indicating the distance to the main subject.

A motor drive circuit 104 individually outputs a drive signal for a focus adjustment motor M1 and a drive signal for a zoom adjustment motor M2 in response to a command output from the CPU 101. The focus adjustment motor M1 constituting the focus lens drive mechanism mentioned earlier drives the focus lens forward/backward. The zoom adjustment motor M2 constituting a zoom lens drive mechanism (not shown) drives a zoom adjustment lens forward/backward along the optical axis.

An operation member 107, which includes a shutter release switch engaged in operation by interlocking with the operation of a shutter release button (not shown), a zoom switch (not shown), a dynamic/still image selector switch (not shown) and the like, outputs operation signals corresponding to operations of the individual switches to the CPU 101. The term "dynamic image" in this context refers to a continuous shooting mode in which images for, for instance, frames are photographed per second, whereas the term "still image" refers to a single-shot photographing mode for photographing images one frame at a time.

The electronic camera system in the embodiment selects the light source to be engaged in light emission in correspondence to the current photographing mode, i.e., the single-shot photographing mode or the continuous shooting mode, the current shutter speed setting and the like.

In the embodiment, a specific light source is automatically selected for each of the following photographing modes. As an operation signal is input to the CPU 101 from the operation member 107 in response to a photographing mode adjustment operation performed by the photographer, the photographing mode is adjusted by the CPU 101 based upon the operation signal.

Mode 1; single-shot photographing mode

Mode 1-1; photographing operation with the shutter speed set equal to or lower than the synchronous speed (e.g., 1/250 sec).

Mode 1-2; photographing operation executed with the shutter speed set greater than the synchronous speed (e.g., 1/250 sec)

Mode 1-3; rear curtain sync photographing

Mode 1-4; front curtain sync photographing

Mode 1-5; slow photographing

Mode 2; continuous shooting mode

In mode 1-1, i.e., when the shutter speed is set equal to or lower than the synchronous speed in the single-shot photographing mode, the CPU 101 at the camera body 70 selects the xenon tube 81 in response to a setting operation for enabling light emission at the illuminating device 80. In addition, if a setting for forcibly engaging the illuminating device 80 in light emission is currently selected or if the results of the exposure calculation described above indicate that illuminating light provided by the illuminating device 80 is necessary, the CPU 101 transmits to the light emission circuit 82 a light emission instruction signal in response to a photographing instruction issued for the camera, e.g., a shutter release operation signal.

Figure 7:
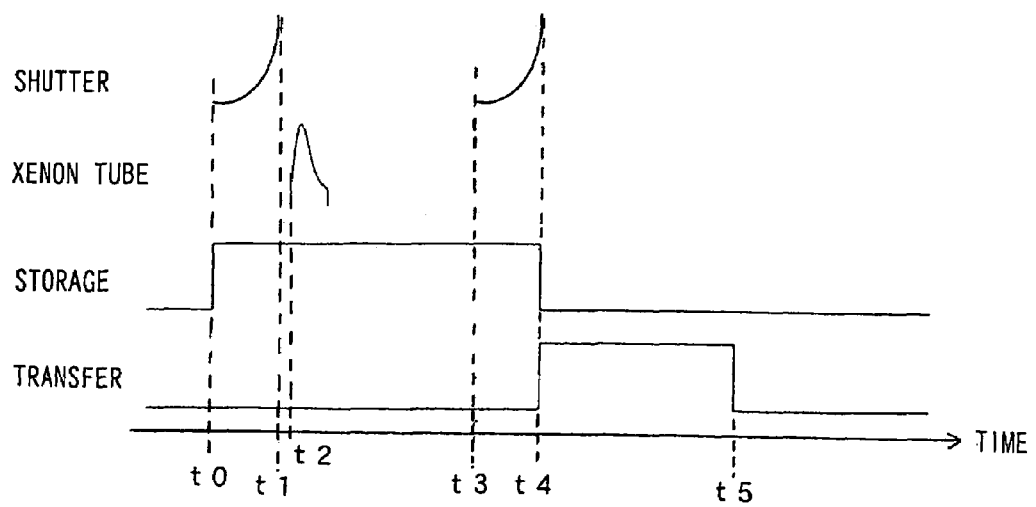
FIG. 7 shows the timing with which a shutter front curtain and a shutter-rear curtain open/close and the timing with which electrical charges are stored and transferred at an imaging element in mode 1-1.

FIG. 7 shows the relationship observed in mode 1-1 among the timing with which the shutter front curtain and the shutter rear curtain constituting the shutter 61 (see FIG. 1) open and close individually, the timing with which electrical charges are stored at the imaging element 121 and the timing with which the electric charges stored at the imaging element 121 are transferred. As a shutter release operation is performed at the camera body 70, the CPU 101 controls a photographing sequence mechanism (not shown) at the camera body 70 to start a photographing operation. As a result, the shutter front curtain starts running along the opening direction at a time point t0 in FIG. 7, and the shutter front curtain, having opened the aperture (not shown), ends its run at a time point t1. The CPU 101 meanwhile outputs a drive signal to the imaging element 121 so as to start electrical charge storage at the time point t0.

If the shutter speed is set equal to or lower than the synchronous speed, the length of time (full open period) elapsing from the time point t1 at which the aperture becomes open until a time point t3 at which the shutter rear curtain starts its run is set greater than the flash period at the xenon tube 81. The CPU 101 transmits to the light emission circuit 82 a signal (a so-called X contact point signal) constituting a light emission start instruction for the xenon tube 81 to start light emission at a time point t2 preceded by the time point t1 and to end the flash light emission by the time point t3.

After a predetermined length of time elapses following the end (the time point t1) of the shutter front curtain run, the photographing sequence mechanism engages the shutter rear curtain to start its run along the aperture closing direction at the time point t3. The predetermined length of time constitutes the aperture open period, which is determined in correspondence to the shutter speed.

At a time point t4, the shutter rear curtain closes the aperture and ends its run. The CPU 101 meanwhile outputs a drive signal for the imaging element 121 to end the electrical charge storage and start a stored charge transfer at the time point t4. As the stored charge transfer ends, the CPU 101 stops the drive signal output to the imaging element 121 at a time point t5. Thus, the xenon tube 81 emits flash light during the aperture open period (full open period) elapsing between the time point t1 and the time point t3 to illuminate the main subject.

In mode 1-2, i.e., when the shutter speed is set higher than the synchronous speed in the single-shot photographing mode, the CPU 101 at the camera body 70 selects the LED 83a in response to a setting operation for enabling light emission at the illuminating device 80. In addition, if a setting for forcibly engaging the illuminating device 80 in light emission is currently selected or if the results of the exposure calculation described above indicate that illuminating light provided by the illuminating device 80 is necessary, the CPU 101 transmits to the light emission circuit 83 a light emission instruction signal in response to a shutter release operation at the camera.

Figure 8:
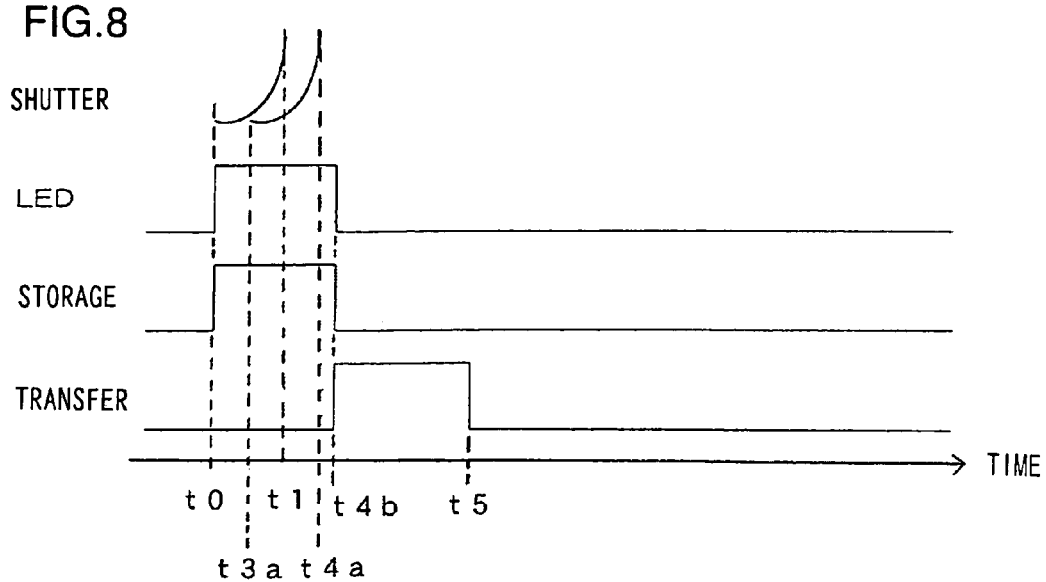
FIG. 8 shows the timing with which the shutter front curtain and the shutter rear curtain open/close and the timing with which electrical charges are stored and transferred at the imaging element in mode 1-2.

FIG. 8 shows the relationship observed in mode 1-2 among the timing with which the shutter front curtain and the shutter rear curtain open and close individually, the timing with which electrical charges are stored at the imaging element 121 and the timing with which the stored electrical charges at the imaging element 121 are transferred. As a shutter release operation is performed at the camera body 70, the CPU 101 controls the photographing sequence mechanism at the camera body 70 to start a photographing operation. As a result, the shutter front curtain starts running along the opening direction at a time point t0 in FIG. 8, and the shutter front curtain, having opened the aperture, ends its run at a time point t1. The CPU 101 meanwhile outputs a drive signal to the imaging element 121 so as to start electrical charge storage at the time point t0.

When the shutter speed exceeds the synchronous speed, the length of time elapsing between the time point t1 at which the aperture becomes opened and a time point t3a at which the shutter rear curtain starts its run is less than the flash period at the xenon tube 81. When the shutter speed is set even higher, slit exposure is executed via the shutter front curtain and the shutter rear curtain, and thus, the shutter rear curtain starts its run (the time point t3a) before the run of the shutter front curtain ends, as shown in FIG. 8. Accordingly, the CPU 101 transmits to the light emission circuit 83 a signal constituting light emission start/light emission end instructions for the LED 83a to start light emission (enter an ON state) at the time point t0, continuously emit light until a time point t4b preceded by a time point t4a at which the shutter rear curtain ends its run, and then end the light emission (enter an OFF state).

After a predetermined length of time elapses following the start (the time point t0) of the shutter front curtain run, the photographing sequence mechanism engages the shutter rear curtain to start its run along the aperture closing direction at the time point t3a. The predetermined length of time constitutes the slit open period, which is set in advance in correspondence to the shutter speed.

At the time point t4a, the shutter rear curtain closes the aperture and ends its run. The CPU 101 outputs a drive signal for the imaging element 121 to end the electrical charge storage and start a stored charge transfer at the time point t4b. As the stored charge transfer ends, the CPU 101 stops the drive signal output to the imaging element 121 at a time point t5. Thus, the LED 83a continuously emits light during the electrical charge storage period elapsing between the time point t0 and the time point t4b to illuminate the main subject.

In mode 1-3, i.e., when a rear curtain sync photographing operation is to be executed in the single-shot photographing mode, the CPU 101 at the camera body 70 selects the xenon tube 81 in response to a setting operation for enabling light emission at the illuminating device 80. In addition, if a setting for forcibly engaging the illuminating device 80 in light emission is currently selected or if the results of the exposure calculation described above indicate that illuminating light provided by the illuminating device 80 is necessary, the CPU 101 transmits to the light emission circuit 82 a light emission instruction signal in response to a shutter release operation at the camera.

Figure 9:
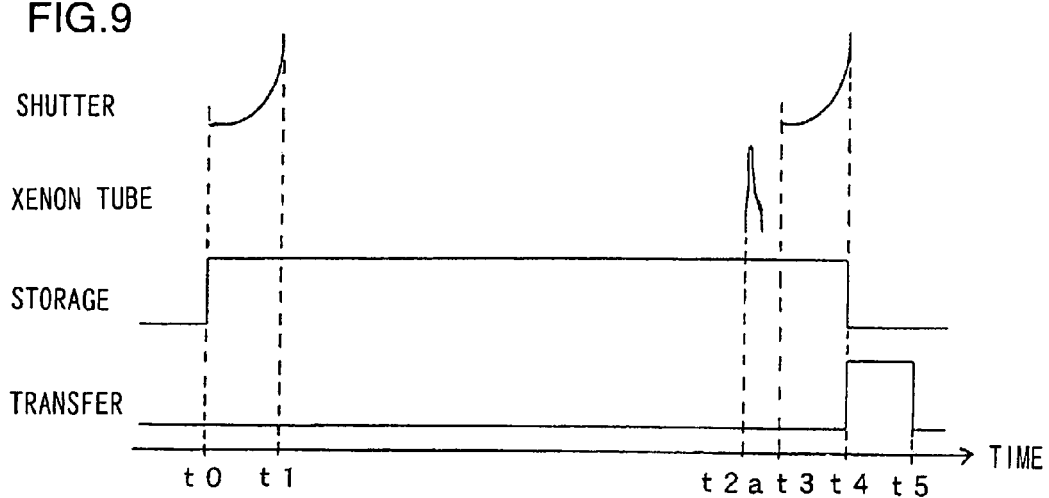
FIG. 9 shows the timing with which the shutter front curtain and the shutter rear curtain open/close and the timing with which electrical charges are stored and transferred at the imaging element in mode 1-3.

FIG. 9 shows the relationship observed in mode 1-3 among the timing with which the shutter front curtain and the shutter rear curtain open and close individually, the timing with which electrical charges are stored at the imaging element 121 and the timing with which the stored electrical charges at the imaging element 121 are transferred. As a shutter release operation is performed at the camera body 70, the CPU 101 controls the photographing sequence mechanism at the camera body 70 to start a photographing operation. As a result, the shutter front curtain starts running along the opening direction at a time point t0 in FIG. 9, and the shutter front curtain, having opened the aperture, ends its run at a time point t1. The CPU 101 meanwhile outputs a drive signal to the imaging element 121 so as to start electrical charge storage at the time point t0.

In the rear curtain sync photographing operation, the full open period elapsing from the time point t1 at which the aperture becomes open until a time point t3 at which the shutter rear curtain starts its run is set greater than the flash period at the xenon tube 81, as in mode 1-1 explained earlier. The CPU 101 transmits to the light emission circuit 82 a signal (a so-called X contact point signal) constituting a light emission start instruction for the xenon tube 81 to start light emission at a time point t2a preceded by the time point t1 and end the flash light emission immediately before the time point t3.

After a predetermined length of time elapses following the end (the time point t1) of the shutter front curtain run, the photographing sequence mechanism engages the shutter rear curtain to start its run along the aperture closing direction at the time point t3. The predetermined length of time constitutes the aperture open period set in advance for the rear curtain sync photographing mode. It is to be noted that in the front curtain sync photographing mode, the shutter speed is set lower than the synchronous speed, to a value that assures the required aperture open period.

At a time point t4, the shutter rear curtain closes the aperture and ends its run. The CPU 101 meanwhile outputs a drive signal for the imaging element 121 to end the electrical charge storage and start a stored charge transfer at the time point t4. As the stored charge transfer ends, the CPU 101 stops the drive signal output to the imaging element 121 at a time point t5. Thus, the xenon tube 81 emits flash light to illuminate the main subject immediately before the shutter rear curtain starts its run during the aperture open period (full open period) elapsing between the time point t1 and the time point t3.

Figure 10:
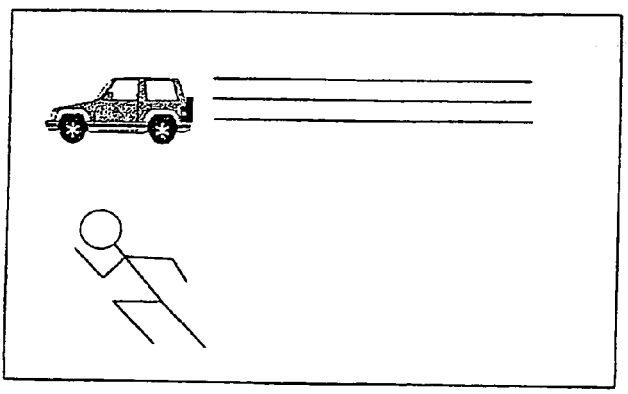
FIG. 10 shows a photographic image that may be photographed through rear curtain sync.

FIG. 10 shows a photographic image that may be obtained through rear curtain sync photographing. The photographer uses the electronic camera system described above to photograph a traveling vehicle and a runner in the rear curtain sync photographing mode. FIG. 10 shows the runner running from right to left with the vehicle traveling in the background also from right to left. The runner is located closer to the photographer than the vehicle in the background, within a range over which he can be illuminated with the illuminating light provided by the illuminating device 80. The surrounding environment is dark and thus, the runner will not be photographed clearly due to underexposure unless he is illuminated with the illuminating device 80.

In the rear curtain sync photographing mode, the illuminating device 80 illuminates the runner immediately before the end of the aperture open period and thus, the runner is photographed at the left in the image plane, as shown in FIG. 10. It is to be noted that the vehicle, traveling outside the illuminating range of the illuminating device 80, will appear as a flowing or moving object in the background regardless of whether or not illuminating light is emitted.

In mode 1-4, i.e., when the front curtain sync photographing is executed in the single-shot photographing mode, the CPU 101 at the camera body 70 selects the xenon tube 81 in response to a setting operation for enabling light emission at the illuminating device 80. In addition, if a setting for forcibly engaging the illuminating device 80 in light emission is currently selected or if the results of the exposure calculation described above indicate that illuminating light provided by the illuminating device 80 is necessary, the CPU 101 transmits to the light emission circuit 82 a light emission instruction signal in response to a shutter release operation at the camera.

Figure 11:
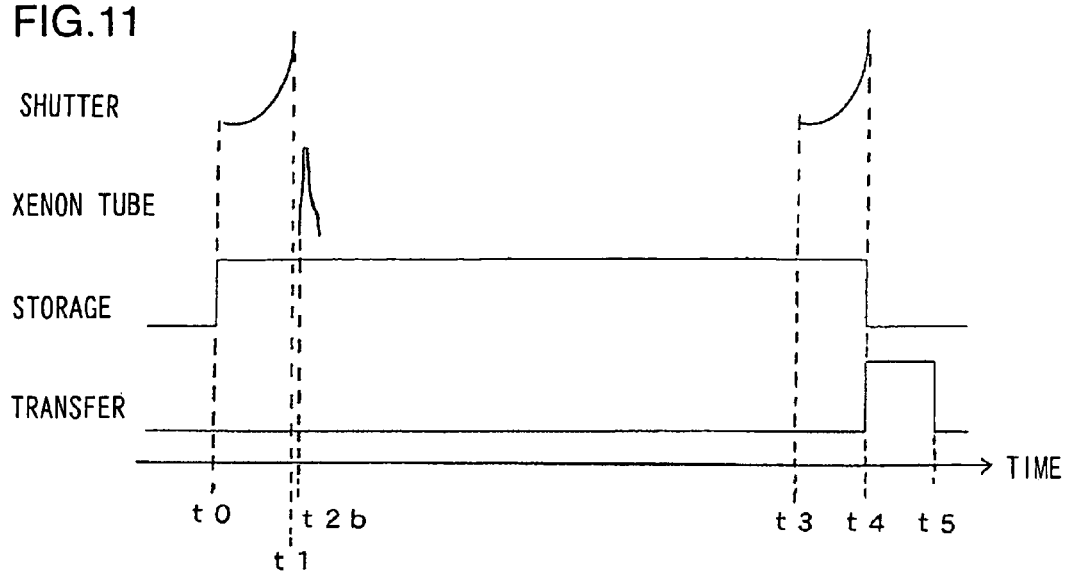
FIG. 11 shows the timing with which the shutter front curtain and the shutter rear curtain open/close and the timing with which electrical charges are stored and transferred at the imaging element in mode 1-4.

FIG. 11 shows the relationship observed in mode 1-4 among the timing with which the shutter front curtain and the shutter rear curtain open and close individually, the timing with which electrical charges are stored at the imaging element 121 and the timing with which the electrical charges stored at the imaging element 121 are transferred. As a shutter release operation is performed at the camera body 70, the CPU 101 controls the photographing sequence mechanism at the camera body 70 to start a photographing operation. As a result, the shutter front curtain starts running along the opening direction at a time point t0 in FIG. 11, and the shutter front curtain, having opened the aperture, ends its run at a time point t1. The CPU 101 meanwhile outputs a drive signal to the imaging element 121 so as to start an electrical charge storage at the time point t0.

In the front curtain sync photographing operation, the full open period elapsing from the time point t1 at which the aperture becomes open until a time point t3 at which the shutter rear curtain starts its run is set greater than the flash period at the xenon tube 81 as in modes 1-1 and 1-3 explained earlier. The CPU 101 transmits to the light emission circuit 82 a signal (a so-called X contact point signal) constituting a light emission start instruction for the xenon tube 81 to start light emission at a time point t2b immediately following the time point t1 and end the flash light emission before the time point t3.

After a predetermined length of time elapses following the end (the time point t1) of the shutter front curtain run, the photographing sequence mechanism engages the shutter rear curtain to start its run along the aperture closing direction at the time point t3. The predetermined length of time constitutes the aperture open period set in advance for the front curtain sync photographing mode. It is to be noted that in the low-speed photographing mode, the shutter speed is set lower than the synchronous speed, to a value that assures the required aperture open period.

At a time point t4, the shutter rear curtain closes the aperture and ends its run. The CPU 101 meanwhile outputs a drive signal for the imaging element 121 to end the electrical charge storage and start a stored charge transfer at the time point t4.

As the stored charge transfer ends, the CPU 101 stops the drive signal output to the imaging element 121 at a time point t5. Thus, the xenon tube 81 emits flash light to illuminate the main subject immediately after the end of the shutter front curtain run during the aperture open period (full open period) elapsing between the time point t1 and the time point t3.

Figure 12:
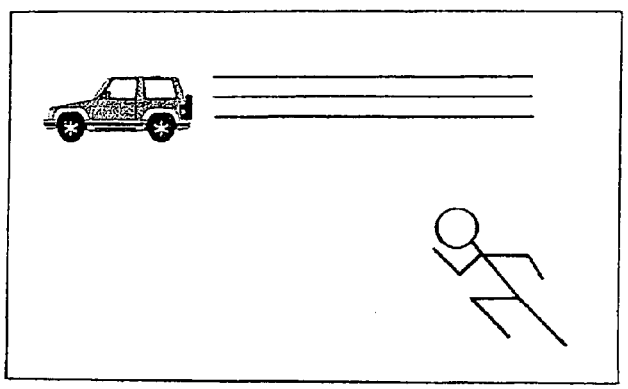
FIG. 12 shows a photographic image that may be photographed through front curtain sync.

FIG. 12 shows a photographic image that may be obtained through front curtain sync photographing. The photographer uses the electronic camera system described above to photograph a traveling vehicle and a runner in the front curtain sync photographing mode. FIG. 12 shows the runner running from right to left with the vehicle traveling in the background also from right to left. The runner is located closer to the photographer than the vehicle in the background, within a range over which he can be illuminated with the illuminating light provided by the illuminating device 80. The surrounding environment is dark and thus, the runner will not be photographed clearly due to underexposure unless he is illuminated with the illuminating device 80.

In the front curtain sync photographing mode, the illuminating device 80 illuminates the runner immediately after the start of the aperture open period and thus, the runner is photographed at the right end of the image plane, as shown in FIG. 12. It is to be noted that the vehicle, traveling outside the illuminating range of the illuminating device 80, will appear as a flowing or moving object in the background regardless of whether or not illuminating light is emitted.

In mode 1-5, i.e., when a low-speed photographing operation is executed in the single-shot photographing mode, the CPU 101 at the camera body 70 selects the LED 83a in response to a setting operation for enabling light emission at the illuminating device 80. In addition, if a setting for forcibly engaging the illuminating device 80 in light emission is currently selected or if the results of the exposure calculation described above indicate that illuminating light provided by the illuminating device 80 is necessary, the CPU 101 transmits to the light emission circuit 83 a light emission instruction signal in response to a shutter release operation at the camera.

Figure 13:
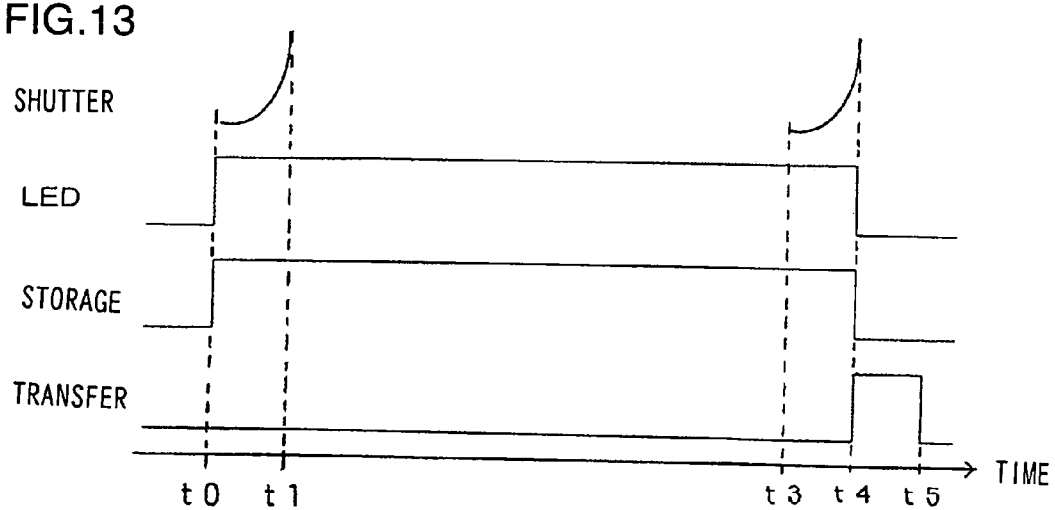
FIG. 13 shows the timing with which the shutter front curtain and the shutter rear curtain open/close and the timing with which electrical charges are stored and transferred at the imaging element in mode 1-5.

FIG. 13 shows the relationship observed in mode 1-5 among the timing with which the shutter front curtain and the shutter rear curtain open and close individually, the timing with which electrical charges are stored at the imaging element 121 and the timing with which the stored electrical charges at the imaging element 121 are transferred. As a shutter release operation is performed at the camera body 70, the CPU 101 controls the photographing sequence mechanism at the camera body 70 to start a photographing operation. As a result, the shutter front curtain starts running along the opening direction at a time point t0 in FIG. 13, and the shutter front curtain, having opened the aperture, ends its run at a time point t1. The CPU 101 meanwhile outputs a drive signal to the imaging element 121 so as to start electrical charge storage at the time point t0.

In the low-speed photographing mode, the LED 83a continuously emits light at least over the entire period of time elapsing between the time point t0 at which the shutter front curtain starts its run and a time point t4 at which the shutter rear curtain ends its run. The CPU 101 transmits to the light emission circuit 83 a signal constituting light emission start/light emission end instructions so as to start the light emission at the LED 83a at the time point t0 and end the light emission at the LED 83a at the time point t4.

After a predetermined length of time elapses following the end (the time point t1) of the shutter front curtain run, the photographing sequence mechanism engages the shutter rear curtain to start its run along the aperture closing direction at the time point t3. The predetermined length of time constitutes the aperture open period set in advance for the low-speed photographing mode. It is to be noted that in the rear curtain sync photographing mode, the shutter speed is set lower than the synchronous speed, to a value that assures the required aperture open period.

At the time point t4, the shutter rear curtain closes the aperture and ends its run. The CPU 101 outputs a drive signal for the imaging element 121 to end the electrical charge storage and start a stored charge transfer at the time point t4. As the stored charge transfer ends, the CPU 101 stops the drive signal output to the imaging element 121 at a time point t5. Thus, the LED 83a continuously emits flash light to illuminate the main subject at least over the period of time elapsing between the time point t0 at which the electrical charges are stored at the imaging element 121 and the time point t4.

Figure 14:
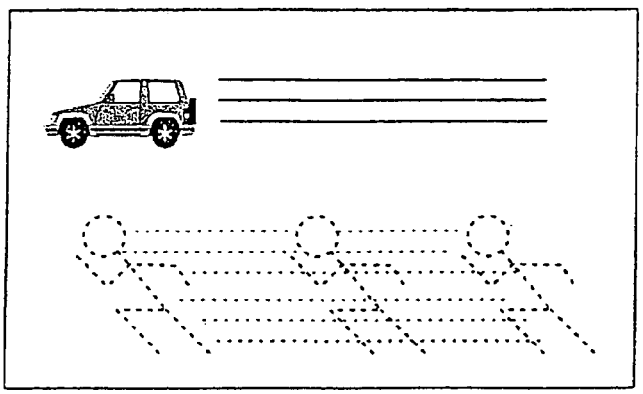
FIG. 14 shows a photographic image that may be obtained through low-speed photographing.

FIG. 14 shows a photographic image that may be obtained through low-speed photographing. The photographer uses the electronic camera system described above to photograph a traveling vehicle and a runner in the low-speed photographing mode. FIG. 14 shows the runner running from right to left with the vehicle traveling in the background also from right to left. The runner is located closer to the photographer than the vehicle in the background, within a range over which he can be illuminated with the illuminating light provided by the illuminating device 80. The surrounding environment is dark and thus, the runner will not be photographed clearly due to underexposure unless he is illuminated with the illuminating device 80.

In the low-speed photographing mode, the runner is continuously illuminated by the illuminating device 80 while the imaging operation (electrical charge storage operation) is in progress at the imaging element 121 and thus, the runner is photographed as a flowing or moving object moving from the right end toward the left end of the image plane, as shown in FIG. 14. It is to be noted that the vehicle traveling outside the illuminating range of the illuminating device 80 will appear as a flowing or moving object (in the background regardless of whether or not the illuminating light is emitted.

In mode 2, i.e., in the continuous shooting mode, the CPU 101 at the camera body 70 selects the LED 83a in response to a setting operation for enabling light emission at the illuminating device 80. In addition, if a setting for forcibly engaging the illuminating device 80 in light emission is currently selected or if the results of the exposure calculation described above indicate that illuminating light provided by the illuminating device 80 is necessary, the CPU 101 transmits to the light emission circuit 83 a light emission instruction signal in response to a shutter release operation at the camera.

Figure 15:
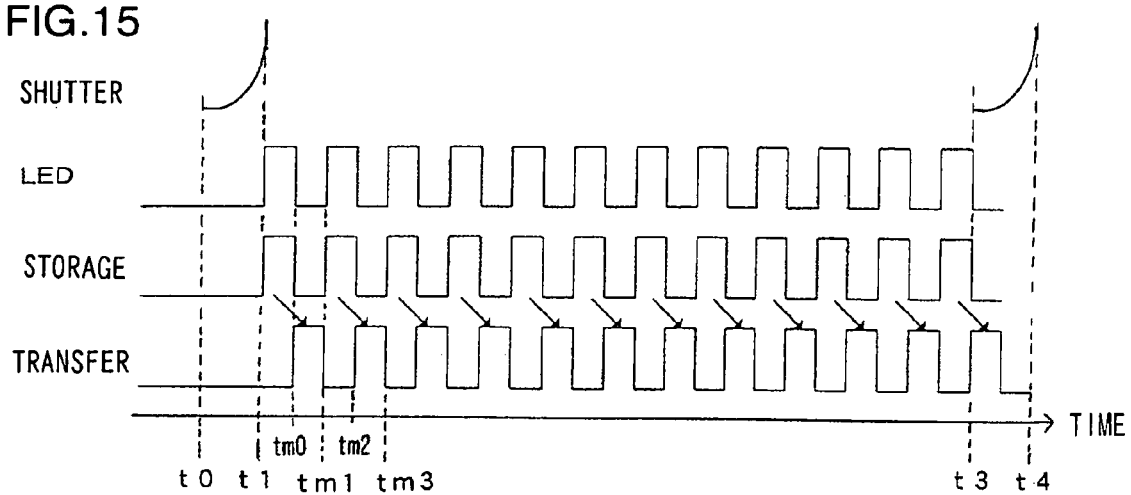
FIG. 15 shows the timing with which the shutter front curtain and the shutter rear curtain open/close and the timing with which electrical charges are stored and transferred at the imaging element in mode 2.

FIG. 15 shows the relationship observed in mode 2 among the timing with which the shutter front curtain and the shutter rear curtain open and close individually, the timing with which electrical charges are stored at the imaging element 121 and the timing with which the stored electrical charges at the imaging element 121 are transferred. As a shutter release operation is performed at the camera body 70, the CPU 101 controls the photographing sequence mechanism at the camera body 70 to start a photographing operation. As a result, the shutter front curtain starts running along the opening direction at a time point t0 in FIG. 15, and the shutter front curtain, having opened the aperture, ends its run at a time point t1. The CPU 101 meanwhile outputs a drive signal to the imaging element 121 so as to start an electrical charge storage at the time point t1, and it also transmits a light emission start instruction signal to the light emission circuit 83 to start light emission at the LED 83a.

At a time point tm0, the CPU 101 outputs a drive signal for the imaging element 121 so as to end electrical charge storage and start transfer of the stored charges. It also transmits to the light emission circuit 83 a signal constituting a light emission end instruction for the LED 83a. At a time point tm1, the stored charge transfer at the imaging element 121 ends.

As described above, the imaging operation and the transfer operation are repeatedly executed in succession at a predetermined frame rate (e.g., 30 frames per second) in the continuous shooting mode. The sum of the length of the storage period and the transfer period per frame varies depending upon the frame rate and at 30 frames per second, the sum amounts to 33.3 msec. At the time point tm1, the CPU 101 outputs to the imaging element 121a drive signal to start an electrical charge storage in order to capture the image for the next frame and also transmits to the light emission circuit 83 a signal constituting a light emission start instruction for the LED 83a again.

Subsequently, the CPU 101 outputs a drive signal for the imaging element 121 so as to end the electrical charge storage and start the stored charge transfer and also transmits to the light emission circuit 83 a signal constituting a light emission end instruction for the LED 83a (a time point tm2). The imaging element 121 then ends the stored charge transfer (a time point tm3).

In response to a photographing end operation performed at the camera body 70, the CPU 101 outputs a drive signal to the imaging element 121 to start the stored charge transfer and also transmits to the light emission circuit 83 a signal constituting a light emission end instruction for the LED 83a at a time point t3 following the end of the electrical charge storage for the last frame. The CPU 101 controls the photographing sequence mechanism to end the photographing operation as well. In response, the photographing sequence mechanism starts a run of the shutter rear curtain along the aperture closing direction.

At a time point t4, the shutter rear curtain closes the aperture and ends its run. In the meantime, the CPU 101 stops the drive signal output to the imaging element 121 as the transfer of the stored charges for the last frame ends.

The embodiment described above is now summarized.

(A) Flash light is emitted by the xenon tube 81 when the shutter speed is set equal to or lower than the synchronous speed in the single-shot photographing mode (mode 1-1), so that the illuminating light provided through the xenon tube 81 can be used to illuminate the main subject efficiently without allowing the illuminating light to be eclipsed either by the shutter front curtain or the shutter rear curtain.

(B) When the shutter speed is set higher than the synchronous speed in the single-shot photographing mode (mode 1-2), the LED 83a is engaged in light emission to continuously emit light at least while the slit defined by the shutter front curtain and the shutter rear curtain moves across the effective imaging area on the imaging element 121. In this mode, no uneven illumination manifests in the photographed image, unlike when illuminating the subject with flash light emitted via the xenon tube 81. In addition, the power consumption can be greatly reduced over the power required for so-called FP light emission at the xenon tube 81 (light emission for repeatedly emitting light with a repeating frequency of approximately 5 kHz).

(C) Since flash light is emitted through the xenon tube 81 in the rear curtain sync photographing mode (mode 1-3) and in the front curtain sync photographing mode (mode 1-4), the illuminating light provided via the xenon tube 81 is used to illuminate the main subject efficiently without allowing the illuminating light to be eclipsed either by the shutter front curtain or the shutter rear curtain as in (A) above. In addition, through the flash light emission, a photographic effect of a dynamic subject photographed as a still image can be achieved.

(D) In the low-speed photographing mode (mode 1-5), the LED 83a is engaged in light emission to continuously emit light while electrical charges are being stored at the imaging element 121, whereby achieving a photographic effect of a dynamic subject captured as a blur through continuous light emission. In addition, the power consumption can be greatly reduced over the power required for repeating light emission at the xenon tube 81 (light emission for repeatedly emitting light with a frequency of 50 to 100 Hz).

(E) In the continuous shooting mode (mode 2) the LED 83a is engaged in light emission (is turned on) to continuously emit light while an electrical charge storage is in progress at the imaging element 121, and the light emission at the LED 83a is suspended (LED remains in an OFF state) while the stored electrical charges are being transferred at the imaging element 121 (while the charge storage is not in progress at the imaging element). Namely, the light emission ON/OFF cycle is repeated in synchronization with the timing with which the image for each frame is photographed at the imaging element 121. As a result the power consumption can be greatly reduced over the power required for repeating light emission at the xenon tube 81 (light emission for repeatedly emitting light with a frequency of 50 to 100 Hz). Furthermore, since the LED 83a is not turned on while electrical charges are being transferred at the imaging element 121, electrical charges are not stored through redundant exposure.

If a signal indicating the completion of the light emission preparation has not been received at the CPU 101 from the charge detection circuit 86 in the light emission circuit 82 at the time point at which a signal constituting a light emission start instruction for the xenon tube 81 is to be transmitted, the CPU 101 may engage the LED 83a in light emission instead of the xenon tube 81. In such a case, the light emission instruction should be transmitted to the light emission circuit 83. By engaging the LED 83a in light emission to enable a photographing operation even when the main capacitor MC has not been charged fully and the xenon tube 81 cannot emit flash light, it can be assured that a good photo opportunity does not need to be missed.

In the embodiment described above, the CPU 101 selects the LED 83a as the continuous shooting mode (mode 2) is selected. While the continuous shooting mode is described in the explanation of the embodiment as a dynamic image photographing mode for successively photographing, for instance, 30 frames per sec, the term "continuous shooting mode" may also be used to refer to a still image continuous shooting mode for photographing dynamic images at 3 to 8 frames per second or for photographing dynamic images at fewer than 30 frames per sec (e.g., 15 frames/sec). It is to be noted that in the still image continuous shooting mode, the xenon tube 81, instead of the LED 83a may be selected. Namely, the xenon tube 81 may be selected in a still image photographing mode including the still image continuous shooting mode, and the LED 83a may be selected in the dynamic image photographing mode.

While an explanation is given above in reference to the embodiment on an example in which the present invention is adopted in an externally mounted illuminating device 80 that is mounted at an accessory shoe of the camera body 70, the present invention may instead be adopted in an illuminating device built into the camera body 70 as an internal component thereof.

In addition, either the xenon tube 81 or the LED 83a may be included in an externally mounted illuminating device and the other light source may be provided as an internal component at the camera body.

Moreover, the illuminating device 80 does not need to be directly mounted at the camera body 70 and may instead be disposed at a position located at a distance from the camera body 70 and instructions for light emission start/light emission stop and an instruction indicating the light emission intensity to be achieved may be provided to the illuminating device 80 from the camera body 70 via a cable as wired signals or as wireless signals provided to the illuminating device 80 from the camera body 70 via radio waves, infrared light or the like.

While an explanation is given above in reference to the embodiment on an electronic camera system that uses an illuminating device 80 equipped with the xenon tube 81 and the LED 83a, the present invention may be adopted in an illuminating device that includes the LED 83a alone. In such a case, too, the light emission at LED 83a should be executed repeatedly in synchronization with the timing with which the image for each frame is photographed at the imaging element 121 in mode 2 as explained earlier.

While an explanation is given above in reference to the embodiment on an example in which the present invention is adopted in a single-lens reflex electronic camera, the present invention may also be adopted in an electronic camera that is not a single-lens reflex camera.

The disclosure of the following priority application is herein incorporated by reference:

Japanese Patent Application No. 2004-034733 filed Feb. 12, 2004

The invention claimed is:

1. A camera system comprising:
   a photographing mode selection device that selects one of a single-shot photographing mode for photographing a single still image for a single frame in response to a photographing instruction and a continuous shooting mode for photographing a plurality of still images for a plurality of frames in response to a photographing instruction;
   a discharge control-type first illuminating device that emits illuminating light toward a subject in response to a light emission instruction issued after light emission is enabled;
   a current-controlled second illuminating device that emits illuminating light toward the subject in response to the light emission instruction; and
   an illumination control device that issues a light emission instruction to only the first illuminating device if the single-shot photographing mode has been selected by the photographing mode selection device and issues the light emission instruction to only the second illuminating device if the continuous shooting mode has been selected by the photographing mode selection device.

2. A camera system according to claim 1, wherein:
   the first illuminating device comprises a charge circuit; and
   if an extent of electrical charge achieved in the charge circuit is still under a predetermined level when a light emission instruction is to be issued to the first illuminating device, the illumination control device issues the light emission instruction to the second illuminating device instead of the first illuminating device.

3. A camera system according to claim 1, further comprising:
- an imaging device that captures a subject image and outputs an imaging signal, wherein:
- the second illuminating device repeatedly emits light and turns off light in synchronization with timing with which the imaging device captures an image for each frame.

4. A camera system comprising:
- a discharge control-type first illuminating device that emits illuminating light toward a subject in response to a light emission instruction issued after light emission is enabled;
- a current-controlled second illuminating device that emits illuminating light toward the subject in response to the light emission instruction; and
- an illumination control device that (1) issues the light emission instruction to only one of the first illuminating device and the second illuminating device if a shutter speed for a photographing operation is set equal to or lower than a synchronous speed for the first illuminating device and (2) issues the light emission instruction to only the second illuminating device if the shutter speed for the photographing operation is set higher than the synchronous speed.

5. A camera system according to claim 4, wherein:
- the illumination control device (3) issues the light emission instruction to only the second illuminating device if the shutter speed for the photographing operation is set equal to or lower than a predetermined speed that is lower than the synchronous speed for the first illuminating device and (4) issues the light emission instruction to only the first illuminating device if the shutter speed for the photographing operation is set higher than the predetermined speed and also equal to or lower than the synchronous speed.

6. A camera system according to claim 5, further comprising:
- a photographing control device that issues an instruction for the second illuminating device to start light emission and an exposure start instruction in response to a photographing instruction when the shutter speed for the photographing operation is set equal to or less than the predetermined speed, and issues an exposure end instruction and a light emission stop instruction for the second illuminating device when a predetermined length of time elapses following the exposure start.

7. A camera system according to claim 4, wherein:
- the illumination control device (3) issues the light emission instruction to only one of the first illuminating device and the second illuminating device if the shutter speed for the photographing operation is set equal to or lower than a predetermined speed that is lower than the synchronous speed for the first illuminating device and (4) issues the light emission instruction to only the first illuminating device if the shutter speed for the photographing operation is set higher than the predetermined speed and also equal to or lower than the synchronous speed.

8. A camera system according to claim 7, wherein:
- the illumination control device issues the light emission instruction to only the first illuminating device when a front curtain sync photography or a rear curtain sync photography is to be executed.

9. The camera system according to claim 1, wherein:
- the photographing mode selection device that selects one of a still image photographing mode for photographing a still image in response to the photographing instruction can further select a dynamic image photographing mode for photographing a dynamic image in response to the photographing instruction; and
- when the dynamic image photographing mode is selected, the illumination control device sends the light emission instruction to the second illuminating device.

10. The camera system according to claim 1, further comprising:
- an imaging device that captures an image for each frame of a plurality of frames and outputs an imaging signal at a timing when capturing the image for each frame of a plurality of frames;
- wherein the illumination control device controls the second illuminating device to repeatedly emit light and turn off light synchronously with the timing when image is captured for each frame by the imaging device, and
- wherein the images for each frame of the plurality of frames are continuously captured in response to a photographing instruction.

11. A camera system according to claim 2, further comprising:
- an imaging device that captures a subject image and outputs an imaging signal, wherein:
- the second illuminating device repeatedly emits light and turns off light in synchronization with timing with which the imaging device captures an image for each frame.

* * * * *